Aug. 9, 1949.  B. D. ELLIOTT  2,478,184
SAFETY HOOK
Filed Oct. 22, 1947
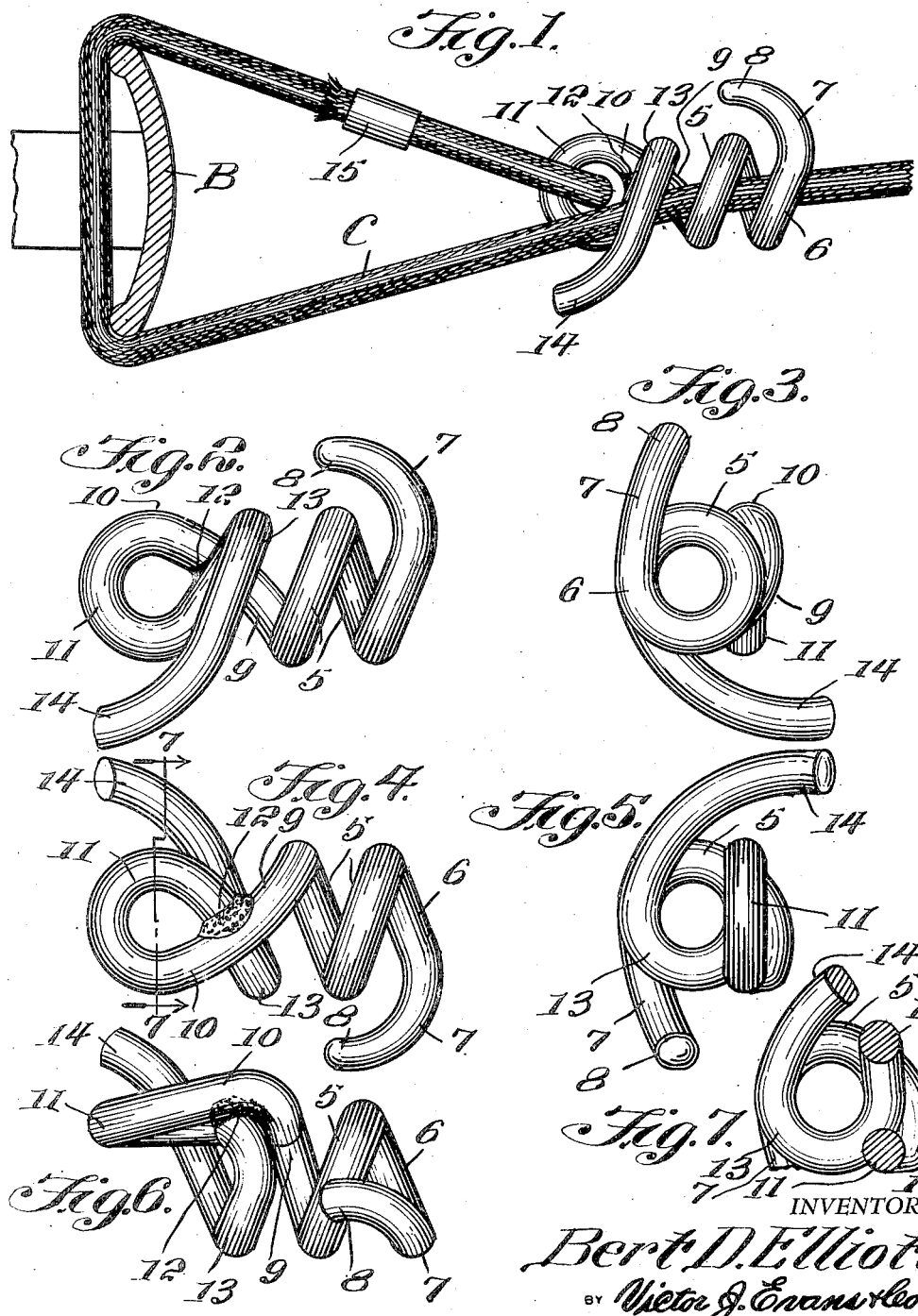
INVENTOR.
Bert D. Elliott,
BY Victor J. Evans & Co.
ATTORNEYS Patented Aug. 9, 1949

2,478,184

UNITED STATES PATENT OFFICE 2,478,184

SAFETY HOOK

Bert D. Elliott, Everett, Wash.; Betty Elliott executrix of said Bert D. Elliott, deceased Application October 22, 1947, Serial No. 781,317

1 Claim. (Cl. 24—131)

This invention relates to hooks, and more particularly, has reference to a safety hook designed for use with a cable in towing vehicles.

By way of background, it is pointed out that commonly, a tow cable will be looped around the portion of the vehicle to be engaged, and held against disengagement by means of the ordinary "grab" hook or the like. It is well known, in this connection, that where this arrangement is employed, slackening of the cable during the towing operation, which almost invariably occurs at some point therein, results, too often, in the cable becoming disengaged from the hook. Not only is this occurrence a clear inconvenience, and time-consuming as to the necessity of again attaching the cable properly, but also, the disconnecting of the towing from the towed vehicle can even be dangerous under many circumstances.

It is an important object of the invention, then, to provide a hook of novel formation which is so designed as to prevent any possibility of the cable becoming disengaged therefrom, even should there be considerable slackening of the cable during the towing operation.

It is a further important object to so form the hook as to meet the above stated object, and yet permit the cable to be threaded therethrough with speed and ease.

Another important object is to provide a hook of the type stated that is capable of manufacture at low cost, is extremely strong and durable, and may be made of comparatively light material, considering the tasks to which it may be applied, by reason of its being specially formed to permit almost all strain to be assumed by the cable with which it is used.

Briefly stated, the invention embodies the novel formation of a hook that is of coiled configuration intermediate its ends, the coils being especially formed to receive a length of tow cable, this being commonly relatively stiff and not of full flexibility, and to permit the cable to center itself during towing operations. The hook is further formed with end portions or prongs so shaped as to prevent any disengagement of the cable from the hook.

With the foregoing and other objects in view which will appear as the description proceeds, reference is had to the attached drawing, forming a part of this specification, in which like numerals refer to like parts, and in which:

Figure 1 is a side elevational view of a preferred form of hook constructed in accordance with the invention, a tow cable being threaded therethrough and secured to a part of a towed vehicle;

Figure 2 is a side elevational view of the hook;

Figure 3 is an end elevational view, taken from the right of Figure 2;

Figure 4 is a side elevational view, in which the hook as illustrated in Figure 2 has been inverted to show its other side;

Figure 5 is an end elevational view, taken from the left of Figure 4;

Figure 6 is a top plan view of Figure 2; and

Figure 7 is a section on line 7—7 of Figure 4.

Referring to the drawing in detail, the hook is conveniently formed from a single length of bar material bent to shape. To form the hook, the material is bent intermediate its ends to provide a spiral bend having a plurality of coils or convolution 5. More than one such convolution can be provided if desired, but I have found that in the instant hook, one suffices fully for the purposes thereof, and provides as well a more compact and less costly hook.

By reference to Figure 1, it is seen that the convolution 5 is of such inner diameter as to permit the cable C, preferably of considerably smaller diameter, to be easily threaded therethrough. Thus, when in use, the cable is permitted a considerable amount of play, and is enabled to center itself during the towing operation, thus lessening frictional engagement of the cable by the hook.

At one end of the convolution 5, the length of material is spirally bent as at 6 to provide a partial continuation of the convolution 5, as if, for example, to begin formation of a second convolution. However, the material is then rearwardly extended to provide a return bend 7, that is further extended to define a curved front prong 8, terminating substantially directly above, and in spaced relation to, the convolution 5. It is seen, then, that the prong 8 overlying convolution 5 constitutes a means for preventing the cable C from slipping therefrom, since any tendency of the cable to slip, by lateral movement in any direction, from said convolution causes the cable to come into engagement with some portion of the prong 8, which curves partially around the cable as it extends forwardly from the convolution, and then is directed rearwardly a substantial distance to overlie the convolution.

Rearwardly of the convolution 5, the length of material used in forming the hook is first spirally bent as at 9 in a partial extension of the spiral formation of the convolution. However, the material is then extended substantially straight to the rear as at 10 and then given a return bend in the same plane so as to define an eye 11. The eye is closed by the material being then forwardly extended in crossed relation to its rearwardly directed part 10, and the crossed portions welded at 12. The material is then curved in a partial convolution 13, so as to curve around the cable, after which the material is extended laterally under, and in spaced relation from, the eye 11, terminating in a relatively elongated rear prong 14.

This rear prong, as will be seen, prevents the cable C from slipping out of engagement by the hook at the rear end thereof. Any tendency of that part of the cable extending rearwardly from the hook to become disengaged by lateral movement only results in the movement of the cable being halted by the curved portion 13 extending partially therearound, or by the prong 14.

The cable C has one end looped through the eye 11 of the hook, and is secured against detachment from the eye by a clamp 15 or the like. It will be seen from Figure 1 that the cable, after being passed around the bumper B or other member of the vehicle to be towed, may be placed in operative engagement with the hook by being threaded therethrough, either from the front or rear end of the hook.

Ordinarily, in use, the cable will be drawn taut, and in such instances, it is permitted a relatively large amount of lateral play within the hook, thereby permitting it to center itself to a considerable extent and substantially preventing excessive frictional engagement between cable and hook. However, should slack occur, the portions of the cable extending to front and rear of the hook, will not, even if the cable goes completely slack, become disengaged from the hook, because the prongs 8 and 14 are so curved and located as to meet and engage the cable and hold it against further movement tending toward disengagement from the hook.

It should be noted that the hook illustrated is especially designed for use with cables, as distinguished from ropes. The use of cables in towing, desirable because of their strength and wearing qualities, presents problems in the formation of a hook to be used therewith, by reason of the cable's relative lack of flexibility, as compared to a rope. A hook for a cable, therefore, should be so formed as to permit the stiff cable to be easily threaded therethrough, and it is seen that it is readily possible with my hook.

I claim:

In a cable fastener, the combination which comprises a continuous rod formed to provide a spiral with spaced coils with the leading end extended outwardly and curved rearwardly from the first coil and with the tip tapered to provide a hooklike overlapping end, and with the end of the last coil at the trailing end of the spiral extended in a plane substantially parallel to the axis of the spiral and in the same plane as that of one side of the coils, said end at the trailing end forming an eye positioned out of the path of a cable extended through the coils, and said end of the trailing end of the spiral being extended from the eye to form another coil and from this coil the end is extended outwardly and rearwardly providing a guide leading a cable into the coils of the fastener.

BERT D. ELLIOTT.

REFERENCES CITED

The following references are of record in the file of this patent:

UNITED STATES PATENTS

| Number | Name | Date |
|---|---|---|
| 750,782 | Ramsey | Jan. 26, 1904 |
| 1,780,184 | Gleason | Nov. 4, 1930 |
| 1,888,875 | Long et al. | Nov. 22, 1932 |
| 1,964,631 | Hansen | June 26, 1934 |
| 2,289,710 | Kelso | July 14, 1942 |